US010320820B2

(12) United States Patent
Lord et al.

(10) Patent No.: US 10,320,820 B2
(45) Date of Patent: Jun. 11, 2019

(54) SYSTEMS AND TECHNIQUES FOR GUIDING A RESPONSE TO A CYBERSECURITY INCIDENT

(71) Applicant: Carbon Black, Inc., Waltham, MA (US)

(72) Inventors: Christopher Lord, Natick, MA (US); Benjamin Johnson, Newport Beach, CA (US); Doran Smestad, Corinna, ME (US); Joshua Hartley, Rutland, MA (US)

(73) Assignee: Carbon Black, Inc., Waltham, MA (US)

(*) Notice: Subject to any disclaimer, the term of this patent is extended or adjusted under 35 U.S.C. 154(b) by 0 days.

(21) Appl. No.: 15/468,942

(22) Filed: Mar. 24, 2017

(65) Prior Publication Data

US 2017/0279822 A1 Sep. 28, 2017

Related U.S. Application Data

(60) Provisional application No. 62/312,797, filed on Mar. 24, 2016.

(51) Int. Cl.
*H04L 29/06* (2006.01)
*G06N 5/04* (2006.01)

(52) U.S. Cl.
CPC ........... *H04L 63/1416* (2013.01); *G06N 5/04* (2013.01); *H04L 63/145* (2013.01);
(Continued)

(58) Field of Classification Search
CPC .......... H04L 63/14; H04L 63/1408; H04L 63/1416; H04L 63/1425; H04L 63/1433;
(Continued)

(56) References Cited

U.S. PATENT DOCUMENTS 9,043,903 B2  5/2015 Diehl et al.
9,183,387 B1* 11/2015 Altman .............. G06F 21/554
(Continued)

FOREIGN PATENT DOCUMENTS

EP      1887754 A1    2/2008
WO   WO-2016037024 A1  3/2016

OTHER PUBLICATIONS

Cushman, (Jan. 23, 2015) "Cyber Security Skill Shortage: A Case for Machine Learning", Available at http://data-informed.com/cyber-security-skill-shortage-case-machine-learning/, (3 pages).
(Continued)

*Primary Examiner* — Nelson Giddins
(74) *Attorney, Agent, or Firm* — Goodwin Procter LLP

(57) ABSTRACT

A cybersecurity engine can guide a forensic investigation of a security incident by estimating the utility of investigating events associated with the security incident, selecting a subset of such events based on the estimated utilities, and presenting data associated with the selected events to the investigator. A method for guiding a response to a security incident may include estimating, for each of a plurality of security events associated with the security incident, a utility of investigating the security event. The method may further include selecting a subset of the security events based, at least in part, on the estimated utilities of investigating the security events. The method may further include guiding the response to the security incident by presenting, to a user, data corresponding to the selected security events.

32 Claims, 2 Drawing Sheets

(52) U.S. Cl.
CPC ...... *H04L 63/1408* (2013.01); *H04L 63/1433* (2013.01); *H04L 63/0227* (2013.01)

(58) Field of Classification Search
CPC ............... H04L 63/1441; H04L 63/145; H04L 63/0227; H04L 63/0236; H04L 63/0245; G06N 5/04; G06F 21/554
See application file for complete search history.

(56) References Cited

U.S. PATENT DOCUMENTS

| | | | |
|---|---|---|---|
| 9,215,244 B2 | 12/2015 | Ayyagari et al. | |
| 9,256,730 B2 | 2/2016 | Wicherski | |
| 9,258,321 B2 | 2/2016 | Amsler et al. | |
| 2009/0293121 A1 | 11/2009 | Bigus et al. | |
| 2013/0097662 A1* | 4/2013 | Pearcy | G06F 21/577 726/1 |
| 2013/0318604 A1* | 11/2013 | Coates | H04L 63/1416 726/22 |
| 2013/0333040 A1 | 12/2013 | Diehl et al. | |
| 2014/0007190 A1 | 1/2014 | Alperovitch et al. | |
| 2014/0075556 A1 | 3/2014 | Wicherski | |
| 2014/0109226 A1 | 4/2014 | Diehl et al. | |
| 2014/0165140 A1 | 6/2014 | Singla et al. | |
| 2014/0189776 A1 | 7/2014 | Diehl | |
| 2014/0201836 A1 | 7/2014 | Amsler | |
| 2014/0215618 A1 | 7/2014 | Striem Amit | |
| 2014/0250524 A1 | 9/2014 | Meyers et al. | |
| 2014/0259170 A1 | 9/2014 | Amsler | |
| 2014/0278664 A1 | 9/2014 | Loomis | |
| 2014/0283026 A1 | 9/2014 | Striem Amit et al. | |
| 2014/0283050 A1 | 9/2014 | Striem Amit | |
| 2014/0317731 A1 | 10/2014 | Ionescu | |
| 2015/0033339 A1 | 1/2015 | Geffner | |
| 2015/0101044 A1 | 4/2015 | Martin et al. | |
| 2015/0106927 A1* | 4/2015 | Ferragut | H04L 63/1416 726/23 |
| 2015/0163109 A1 | 6/2015 | Ionescu | |
| 2015/0222646 A1 | 8/2015 | Diehl et al. | |
| 2015/0244679 A1 | 8/2015 | Diehl et al. | |
| 2015/0356301 A1 | 12/2015 | Diehl et al. | |
| 2016/0021056 A1 | 1/2016 | Chesla | |
| 2016/0028759 A1* | 1/2016 | Visbal | H04L 63/1441 726/22 |
| 2016/0072836 A1 | 3/2016 | Hadden et al. | |
| 2016/0301709 A1* | 10/2016 | Hassanzadeh | H04L 63/1433 |
| 2017/0257388 A1* | 9/2017 | Addepalli | H04L 63/1416 |
| 2018/0077187 A1 | 3/2018 | Garman et al. | |

OTHER PUBLICATIONS

McAfee Press Release, (Apr. 13, 2015) "Intel Security Report Details Challenges Slowing Response to Targeted Attacks", Available at http://www.mcafee.com/us/about/news/2015/q2/20150413-01.aspx, (3 pages).

International Search Report and Written Opinion for International Application No. PCT/US2017/024018 dated Jun. 21, 2017 (13 pages).

Azmandian et al., "Virtual Machine Monitor-Based Lightweight Intrusion Detection," ACM SIGOPS Operating Systems Review; Jul. 18, 2011; 45(2): 38-53.

International Search Report and Written Opinion for International Application No. PCT/US2017/051601 dated Nov. 6, 2017 (17 pages).

* cited by examiner

SYSTEMS AND TECHNIQUES FOR GUIDING A RESPONSE TO A CYBERSECURITY INCIDENT

CROSS-REFERENCE TO RELATED APPLICATION(S)

This application claims priority and benefit under 35 U.S.C. § 119(e) of U.S. Provisional Patent Application Ser. No. 62/312,797, titled "Systems and Techniques for Guiding a Response to a Cybersecurity Incident" and filed on Mar. 24, 2016, which is hereby incorporated by reference herein in its entirety.

FIELD OF INVENTION

The present disclosure relates generally to cybersecurity systems and techniques. In particular, some embodiments relate to systems and techniques for guiding a response to a cybersecurity incident.

BACKGROUND

As the Internet and other networked computer systems become increasingly integrated into public activities (e.g., management and operation of governmental organizations) and private activities (e.g., personal activities, management and operation of households and businesses, etc.), breaches of computer system security pose an increasingly significant threat to such pursuits. Security breaches generally involve disruptions to the operation of computer systems (e.g., use of computational resources for unauthorized purposes, damage to computer components, computers, or entire networks, etc.) and/or theft of resources from computer systems (e.g., gathering of sensitive data). Computer system users can devote significant resources to detecting security problems (e.g., suspected or actual threats to or breaches of the security of computer systems, etc.) and preventing security problems from disrupting the operations of their computer systems or stealing their computer system-based resources.

Some security breaches are caused by malicious software ("malware"). Malware can be deployed in many forms, including computer viruses, worms, trojan horses, ransomware, spyware, adware, scareware, keystroke loggers, rootkits, bots, crimeware, phishing scams, etc. Conventional cybersecurity engines generally rely on signature-based techniques for detecting malware. In general, signature-based malware detection involves obtaining a copy of a file that is known to contain malware, analyzing the static features of the file (e.g., the sequence of bytes contained in the file) to extract a static signature that is characteristic of the malware, and adding the malware's static signature to a database (often referred to as a "blacklist") of known malware. When a user attempts to access (e.g., download, open, or execute) a file, the cybersecurity engine scans the file and extracts the file's static signature. If the file's static signature matches a signature on the blacklist, the cybersecurity engine detects the presence of malware and intervenes to prevent the malware from executing (e.g., by quarantining or deleting the file).

Static malware detection techniques are generally useful for quickly detecting known malware. However, these techniques can generally be circumvented by new malware that is not yet blacklisted (e.g., zero-day malware or next-generation malware) or by malware that modifies itself to avoid matching a static signature on the blacklist (e.g., oligomorphic, polymorphic, or metamorphic malware). Furthermore, security problems can arise from sources other than malware (e.g., from denial of service attacks, packet floods, etc.).

Some cybersecurity engines rely on behavior-based techniques for detecting malware and other security problems. In general, behavior-based security techniques involve monitoring occurrences on a computer system, identifying suspicious occurrences, and when suspicious occurrences are identified, intervening to assess the problem (e.g., by initiating a forensic investigation of the occurrence, etc.) and to protect the computer system.

SUMMARY OF THE INVENTION

Forensic investigations of suspicious occurrences in computer systems are generally performed by forensic investigators (or teams of forensic investigators) having a high degree of expertise in cybersecurity. Even so, forensic investigations can be very time-consuming, because security problems can be difficult to distinguish from the immense volume of innocuous occurrences in a computer system. In many cases, the process of sifting through the available information relating to a suspicious occurrence to determine whether a security problem exists and to identify the scope and root cause of the security problem can be akin to the proverbial search for "a needle in a haystack."

Thus, the detection of a suspicious occurrence in a computer system can create a dilemma for the system's operator. If the operator allows the system to remain fully functional during the forensic investigation, and the suspicious occurrence ultimately leads to the detection of a security problem, the risk posed by the security problem remains unchecked during the forensic investigation—despite the earlier detection of the suspicious occurrence. On the other hand, if the operator disables or quarantines portions of the computer system during forensic investigations that ultimately do not result in the detection of security problems, there is a risk that the forensic investigations themselves may become as disruptive or more disruptive than the actual security problems.

These risks can be reduced by decreasing the time period in which accurate forensic investigations are performed. Thus, more efficient (e.g., faster and/or more accurate) systems and techniques for forensic investigation are needed. The inventors have recognized and appreciated that a cybersecurity engine can guide a forensic investigation of a security incident by estimating the utility of investigating events associated with the security incident, selecting a subset of such events based on the estimated utilities, and presenting data associated with the selected events to the investigator. In this way, some embodiments of the systems described herein can automatically sift through the events associated with a security incident, identify the events that are likely to provide key clues to the root cause and scope of the security incident, and guide the investigator to prioritize investigation of those events.

The inventors have further recognized and appreciated that the utility of investigating a security event may be estimated based, at least in part, on objective indicators of utility and/or subjective indicators of utility. Some examples of objective indicators of the utility of investigating a security event include (1) the reputation of an entity associated with the event, (2) the frequency of occurrence of the event, (3) the adjacency (e.g., relevance) of the event to the security incident, to other security events, and/or to other security incidents, etc. One example of a subjective indicator of the utility of investigating an event is a forensic investigator's level of interest in performing an investigation of the event. In some embodiments, the investigator's level of interest in performing an investigation of an event can be estimated using a predictive model (e.g., a machine learning model trained on data that indicates (1) which events an investigator has investigated during past incident responses, (2) how the investigator has responded to suggestions to investigate similar events during past incident responses, etc.).

According to an aspect of the present disclosure, a method for guiding a response to a security incident is provided, the method including estimating, for each of a plurality of security events associated with the security incident, a utility of investigating the security incident; selecting a subset of the security events based, at least in part, on the estimated utilities of the security events; and guiding the response to the security incident by presenting, to a user, data corresponding to the selected security events.

In some embodiments, the plurality of security events includes a first security event, and the utility of investigating the first security event is estimated based, at least in part, on one or more objective and/or subjective indicators thereof.

In some embodiments, the one or more objective indicators of the utility of investigating the first security event include reputational data indicating a reputation of an entity associated with the first security event, frequency data indicating a frequency of the first security event, and/or adjacency data indicating an adjacency of the first security event to one or more other security events. In some embodiments, the reputational data indicate a reputation of a file associated with the first security event, a reputation of a software provider that provided or certified the file, a reputation of a process associated with the security event, and/or a reputation of an entity corresponding to communications associated with the security event. In some embodiments, the method further includes selecting the one or more other security events from a set of security events previously investigated in connection with the response to the security incident. In some embodiments, the method further includes selecting the one or more other security events from a set of security events previously presented in connection with the response to the security incident. In some embodiments, the method further includes selecting the one or more other security events from a set of security events previously presented in connection with a response to another security incident. In some embodiments, the method further includes determining the adjacency of the first security event to the one or more other security events based, at least in part, on a relevance of the first security event to the one or more other security events.

In some embodiments, the one or more subjective indicators of the utility of investigating the first security event include interest data indicating an investigator's level of interest in investigating security events. In some embodiments, the interest data are obtained based, at least in part, on a machine-executable predictive model of one or more forensic investigators' level of interest in performing investigations of security events. In some embodiments, the predictive model includes a classifier trained to classify security events based on types and/or attributes of the security events.

In some embodiments, the method further includes assigning respective rankings to the selected security events, wherein the data corresponding to the selected security events are presented in accordance with the assigned rankings. In some embodiments, the rankings are assigned to the selected security events based, at least in part, on one or more objective and/or subjective indicators of respective utilities of investigating the selected security events. In some embodiments, the one or more subjective indicators of the utilities of investigating the selected security events include interest data indicating an investigator's level of interest in investigating security events, and the interest data are obtained based, at least in part, on a machine-executable predictive model of one or more forensic investigators' level of interest in performing investigations of security events. In some embodiments, the predictive model includes a classifier trained to classify security events based on types and/or attributes of the security events.

In some embodiments, the method further includes prompting the user to investigate one or more of the selected security events. In some embodiments, the method further includes prompting the user to eliminate one or more of the selected security events from consideration for investigation.

According to another aspect of the present disclosure, a system is provided, the system including data processing apparatus programmed to perform operations including estimating, for each of a plurality of security events associated with a security incident, a utility of investigating the security incident; selecting a subset of the security events based, at least in part, on the estimated utilities of the security events; and guiding a response to the security incident by presenting, to a user, data corresponding to the selected security events.

In some embodiments, the plurality of security events includes a first security event, and wherein the utility of investigating the first security event is estimated based, at least in part, on one or more objective and/or subjective indicators thereof.

In some embodiments, the one or more objective indicators of the utility of investigating the first security event include reputational data indicating a reputation of an entity associated with the first security event, frequency data indicating a frequency of the first security event, and/or adjacency data indicating an adjacency of the first security event to one or more other security events. In some embodiments, the reputational data indicate a reputation of a file associated with the first security event, a reputation of a software provider that provided or certified the file, a reputation of a process associated with the security event, and/or a reputation of an entity corresponding to communications associated with the security event. In some embodiments, the operations further include selecting the one or more other security events from a set of security events previously investigated in connection with the response to the security incident, from a set of security events previously presented in connection with the response to the security incident, and/or from a set of security events previously presented in connection with a response to another security incident. In some embodiments, the operations further include determining the adjacency of the first security event to the one or more other security events based, at least in part, on a relevance of the first security event to the one or more other security events.

In some embodiments, the one or more subjective indicators of the utility of investigating the first security event include interest data indicating an investigator's level of interest in investigating security events. In some embodiments, the interest data are obtained based, at least in part, on a machine-executable predictive model of one or more forensic investigators' level of interest in performing investigations of security events. In some embodiments, the predictive model includes a classifier trained to classify security events based on types and/or attributes of the security events.

In some embodiments, the operations further include assigning respective rankings to the selected security events, and the data corresponding to the selected security events are presented in accordance with the assigned rankings. In some embodiments, the rankings are assigned to the selected security events based, at least in part, on one or more objective and/or subjective indicators of respective utilities of investigating the selected security events. In some embodiments, the one or more subjective indicators of the utilities of investigating the selected security events include interest data indicating an investigator's level of interest in investigating security events, and the interest data are obtained based, at least in part, on a machine-executable predictive model of one or more forensic investigators' level of interest in performing investigations of security events. In some embodiments, the predictive model includes a classifier trained to classify security events based on types and/or attributes of the security events.

Some embodiments of the techniques described herein may exhibit certain advantages over conventional incident response systems and techniques. For example, some embodiments may yield quicker and/or more accurate determinations of the root causes and scopes of security incidents. Thus, some embodiments may reduce disruptions to the operation of computer systems during forensic investigations or after security breaches, thereby improving the overall functioning of the computer systems. In some embodiments, the use of guided incident response techniques may enhance the effectiveness (e.g., speed, accuracy, etc.) of forensic investigators, including investigators with relatively high degrees of expertise and/or investigators with relatively low degrees of expertise. In this way, some embodiments may decrease the costs associated with forensic investigation of security incidents.

Other aspects and advantages of the invention will become apparent from the following drawings, detailed description, and claims, all of which illustrate the principles of the invention, by way of example only. The foregoing Summary, including the description of motivations for some embodiments and/or advantages of some embodiments, is intended to assist the reader in understanding the present disclosure, and does not in any way limit the scope of any of the claims.

BRIEF DESCRIPTION OF THE DRAWINGS

Certain advantages of some embodiments may be understood by referring to the following description taken in conjunction with the accompanying drawings. In the drawings, like reference characters generally refer to the same parts throughout the different views. Also, the drawings are not necessarily to scale, emphasis instead generally being placed upon illustrating principles of some embodiments of the invention.

DETAILED DESCRIPTION

Terms

Figure 1:
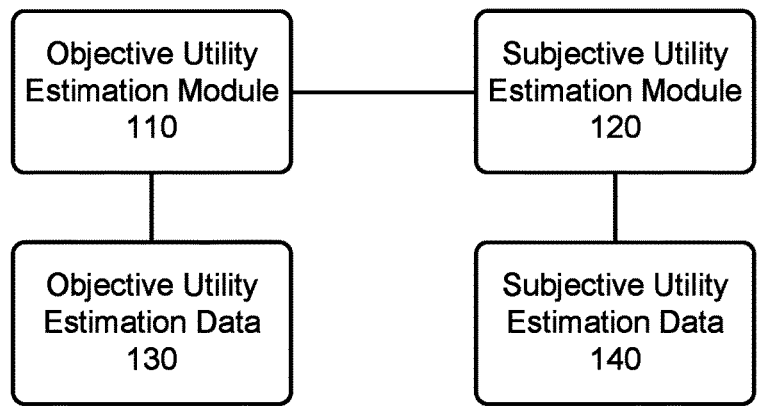
FIG. 1 is a block diagram of a system for guiding a response to a security incident, in accordance with some embodiments.

The term "computer system," as used herein, may include one or more computers and/or computer networks (e.g., a plurality of computers and one or more networks communicatively coupling those computers).

The term "security problem," as used herein, may include an actual or suspected threat to or breach of the security of a computer system.

The term "security event" or "event," as used herein, may include any occurrence in a computer system that has been determined to be malicious (e.g., to indicate the existence of an actual security problem) or suspicious (e.g., to indicate the existence of a potential security problem). The determination that an occurrence is malicious or suspicious may be made manually (e.g., by a user of the computer system) or automatically (e.g., by a component of the computer system or a device in communication with the computer system), using any suitable techniques. Some examples of types of events may include, without limitation, a system crash, a packet flood, unauthorized use of system privileges, unauthorized access to data, a denial of service attack, unauthorized modification of software, a policy violation, a virus infection, execution of malware, a change in the state of a file or system component, the presence of an entry in a log (e.g., a firewall log), the presence of a file (e.g., a binary file) in a storage medium of the computer system, etc.

The term "security incident" or "incident," as used herein, may include a set of one or more security events that have been determined to be actually or potentially related (e.g., actually or potentially related to the same security problem). The determination that a security event is actually or potentially related to a particular security problem may be made manually (e.g., by a user of the computer system) or automatically (e.g., by a component of the computer system or a device in communication with the computer system), using any suitable techniques.

The term "incident response," as used herein, may include any actions or operations performed based, at least in part, on the detection of a security incident and/or a security event. Incident response actions or operations may include, without limitation, initiating a forensic investigation of a security event and/or incident, investigating a security event and/or security incident, mitigating the harm caused by a security event and/or incident, etc.

An investigation of a security event may include any activities that facilitate a determination as to whether the security event is related to a security problem, identification of a root cause of the security event, a determination of the scope of the security event, etc.

In cases where a security event involves access to data, investigating the security event may include identifying the accessed data, determining whether the accessed data were modified, deleted, copied, or transmitted, determining whether the accessed data were valuable or confidential, determining which user account was used to access the data, etc.

In cases where a security event involves communication over a network, investigating the security event may include determining which network resources (e.g., network ports, network interfaces, etc.) were accessed, determining the address (e.g., Internet Protocol (IP) address) of the remote device that communicated with the computer system via the network, determining whether the address of the remote device is known to be associated with malicious or suspicious activity, etc.

An investigation of a security event may include determining which process performed the act(s) that caused the security event, determining whether the process is a known malware process, determining which user initiated execution of the process, etc.

An investigation of a security event may include determining which binary file was executed to initiate the process that caused the security event, determining whether the binary file is a known malware file, determining which user loaded the binary file onto the computer system, determining how was the binary file was loaded onto the computer system, etc.

An investigation of a security incident may include investigations of one or more security events that are part of the security incident, and/or any activities that facilitate identification of a root cause of the security incident, determination of the scope of the security incident, determination of the risk or threat posed by the security incident, etc.

Mitigating the harm caused by a security event and/or incident may include quarantining malicious or suspicious files or processes, disconnecting one or more computers from a computer network, disabling or deactivating portions of the computer system, etc.

A System for Guiding Incident Response

FIG. 1 shows a system 100 for guiding a response to a security incident, in accordance with some embodiments. In operation, the guidance system 100 may guide an investigator to prioritize event investigations that are estimated to have greater utility to the response to the security incident, relative to investigations of other events. In some embodiments, the estimated utility of an event investigation to an incident response represents the extent to which the investigation of the event is expected to provide useful clues to the attributes (e.g., root cause, scope, risk/threat level, etc.) of the security incident and/or to advance the forensic investigation of the security incident toward its resolution.

In some embodiments, the guidance system 100 may guide the investigator to prioritize event investigations with high estimated utility to the incident response by implicitly or explicitly suggesting that the investigator perform such investigations prior to (or in lieu of) investigating other events. For example, the guidance system 100 may rank a set of security events according to the estimated utility of investigating those security events, and/or may prompt the investigator to perform event investigations with high estimated utility prior to (or in lieu of) prompting the investigator to investigate other events (e.g., by displaying data associated with events for which the estimated utility of investigation is high prior to, or in lieu of, displaying data associated with other events).

As can be seen in FIG. 1, some embodiments of the guidance system 100 include an objective utility estimation module 110 and a subjective utility estimation module 120. The objective utility estimation module 110 may be machine-executable (e.g., computer executable), and may estimate the objective utility of investigating security events (e.g., may estimate the utility of investigating security events based on objective indicators of utility). The subjective utility estimation module 120 may be machine-executable, and may estimate the subjective utility of investigating security events (e.g., may estimate the utility of investigating security events based on subjective indicators of utility). In some embodiments, the guidance system 100 may be a part of a larger incident response system, wherein occurrences are monitored to determine whether an event or incident has occurred.

The objective utility estimation module 110 may estimate the utility of investigating security events based on objective utility estimation data 130. The objective utility estimation data 130 may include, without limitation, reputation data, frequency data, adjacency data, and/or any other data suitable for estimating the objective utility of investigating security events. The afore-mentioned types of objective utility estimation data 130 are described in turn below.

Reputation data may include any data indicative of the reputation of any entity associated with a security event. Some examples of entities associated with a security event in a computer system may include a file associated with a security event (e.g., the binary file executed to generate a process associated with the security event); the software provider (or other entity) that provided or certified such a file; a remote device associated with a security event (e.g., a remote device that communicated with the computer system); the owner, operator, or domain (e.g., network domain) of such a device; a user whose account was used to execute a process, access a file, or send/receive a communication associated with the security event; such a user account; a registry entry (e.g., key) accessed by a registry operation; a process associated with a security event (e.g., the process that performed a suspicious operation); a host associated with a security event (e.g., the host on which a process performed a suspicious operation); etc. Such reputation data may be obtained from a cybersecurity provider, generated based on previous investigations of security threats and/or breaches of one or more computer systems (e.g., the computer system that is the subject of the forensic investigation), and/or obtained using any other suitable technique.

The reputation data may indicate an entity's reputation using a set of classifications (e.g., known good reputation/known bad reputation/unknown reputation, etc.), a numerical rating (e.g., a numerical value between 1 and 10, where values toward one end of the range represent better reputations and values toward the other end of the range represent worse reputations), or any other suitable technique.

Frequency data may include any data indicative of the frequency of any occurrence in a computer system. Some examples of occurrences in a computer system may include loading a particular file (e.g., a particular binary file), executing a particular process, accessing an address in a particular range of addresses in a memory space, accessing a particular registry entry in an operating system's registry, accessing a particular peripheral device of the computer system, communicating with a particular device (or a device at a particular address, or device(s) within a particular domain), etc. In some embodiments, frequency data may indicate the frequency with which an occurrence was observed in a computer system, the frequency with which the occurrence was investigated as part of a forensic investigation, and/or the frequency with which the occurrence was determined to be associated with an actual security threat or security breach. Such reputation data may be obtained from a cybersecurity provider, generated based on monitoring of occurrences in one or more computer systems (e.g., the computer system that is the subject of the forensic investigation), and/or obtained using any other suitable technique.

The frequency data may indicate the frequency of an occurrence using a set of classifications (e.g., high frequency/low frequency/unknown frequency, or common occurrence/rare occurrence/unique occurrence, etc.), a numerical rating (e.g., a numerical value between 1 and 10, where values toward one end of the range represent higher frequencies and values toward the other end of the range represent lower frequencies), an absolute value (e.g., the number of times the occurrence was observed in a computer system during a specified time period), a time rate (e.g., the number of times the occurrence has been observed in a computer system per unit time, on average), an investigation rate (e.g., the ratio between the number of times the occurrence has been investigated and the number of times the occurrence has been observed), a problem rate (e.g., the ratio between the number of times the occurrence has been determined to be associated with an actual security problem and the number of times the occurrence has been observed), etc.

Adjacency data may include any data indicative of similarities and/or differences between security events. In some embodiments, adjacency data may be used to determine the degree of similarity between a security event (e.g., an event that is a candidate for investigation) and one or more other security events (e.g., security events previously suggested by the guidance system for investigation in connection with the same incident response or another response to a similar incident, security events previously investigated in connection with the same incident response or another response to a similar incident, etc.). Such adjacency data may be obtained from a cybersecurity provider, generated based on investigations of the same security incident or similar security incidents, and/or obtained using any other suitable technique.

The adjacency data may indicate the similarity of an event to another event or set of events using a set of classifications (e.g., similar/not similar, etc.), a numerical rating (e.g., a numerical value between 1 and 10, where values toward one end of the range represent more similarity and values toward the other end of the range represent less similarity), etc. The similarity between two events may be determined by representing the attributes of the events as vectors in a multidimensional space and computing the dot product of the vectors, or by any other suitable technique. Some examples of attributes of events may include the event's type, the event's frequency, the entity or entities associated with the event, etc.

Alternatively or in addition, adjacency data may include any data indicative of the relevance of entities and/or events to other entities and/or events. In this context, relevance can be direct or indirect. In some embodiments, there is direct relevance between two entities E1 and E2 if one of the entities influences the other entity (e.g., performs an operation on the other entity, communicates with the other entity, accesses resources of the other entity, and/or is derived from the other entity). For example, E1 may create, delete, or access E2 (e.g., where E1 is a process and E2 is a file, a registry key, or other data). As another example, E1 may transmit or receive E2 via network communication (e.g., where E1 is a process and E2 is a file or other data). As yet another example, E1 may obtain data from E2 or send data to E2 (e.g., where E1 is a process and E2 is a process, a data storage device, or a network-connected device). As yet another example, E1 may be instantiated from E2 (e.g., where E1 is a process and E2 is a binary file). The foregoing examples are not limiting; other types of occurrences can give rise to direct relevance between two entities.

Direct relevance can be bidirectional (two-way) or unidirectional (one-way). In cases of bidirectional direct relevance, any occurrence that makes an entity E1 directly relevant to an entity E2 also makes the entity E2 directly relevant to the entity E1. In cases of unidirectional direct relevance, an occurrence that makes an entity E1 directly relevant to an entity E2 does not necessarily make the entity E2 directly relevant to the entity E1. Rather, an entity E1 may be directly relevant to an entity E2 if activities or attributes of E1 influence activities or attributes of E2. For example, if E1 performs an operation on E2 or sends information to E2, then E1 may be directly relevant to E2, but E2 may not be directly relevant to E1. As another example, if E1 accesses resources of E2 or is derived from E2, then E2 may be directly relevant to E1, but E1 may not be directly relevant to E2.

In some embodiments, if an event E2 is associated with a security incident and an event E1 is directly relevant to E2, a guidance system 100 may determine that E1 is also associated with the security incident, meaning that E1 is at least potentially related to the security problem that gave rise to the security incident. The guidance system 100 can then use the techniques described herein to assess the utility of investigating events associated with entity E1 in connection with the investigation of the security incident.

In some embodiments, an entity E1 is indirectly relevant to an entity EN if there is a sequence of entities E1→ . . . EN−1→EN (N>2), where the notation "E1→E2" indicates that entity E1 is directly relevant to entity E2. In some embodiments, if an event EN is associated with a security incident and an event E1 is indirectly relevant to EN, a guidance system 100 may determine that E1 is also associated with the security incident, meaning that E1 is at least potentially related to the security problem that gave rise to the security incident. The guidance system 100 can then use the techniques described herein to assess the utility of investigating events associated with entity E1 in connection with the investigation of the security incident.

The guidance system 100 can use relevance-based adjacency data to identify entities and/or events that are "distant" from the events associated with a security incident, but potentially relevant to the security problem that gave rise to the security incident. In this context, an event V1 may be temporally distant from another event V2 (1) if V1 occurs substantially earlier or later than V2 occurs, for example, if the amount of time between the occurrence of V1 and the occurrence of V2 exceeds a threshold time period, or (2) if the events occur in different sessions, etc. An event V1 may be spatially distant from another event V2 if V1 and V2 (1) occur on different devices or (2) are associated with different user accounts, etc. Likewise, an entity E1 may be spatially distant from another entity E2 if E1 and E2 are (1) located on different devices or (2) associated with different user accounts.

For example, a file A may instantiate a process A' on a host device, and the process A' may create a file B and register B to start as a service. When the host device is subsequently rebooted, the host may instantiate the file B as a process B'. In this scenario, the adjacency data may indicate that file A and/or process A' are relevant to file B and/or process B', and the guidance system may therefore sweep A and/or A' into an investigation of any security incident associated with file B and/or process B'. More generally, monitoring the relevance among events and activities may enable the guidance system 100 to detect relationships and influences that might otherwise be difficult to detect using conventional techniques, for example, relationships between different types of events (e.g., the downloading of a file F on a host H and the subsequent initiation of a service S on host H), relationships between events on different devices (e.g., the execution of a process P1 on a host H1 and the execution of a process P2 on a host H2), or relationships across time (e.g., the occurrence of an event days or weeks prior to the subsequent occurrence of one or more events associated with a security incident).

In some embodiments, the adjacency data may include a statistical model of the relevance of entities and/or events to other entities and/or events. In the statistical model, entities and/or events may be represented as variables, and relevance relationships may be represented as conditional dependences between the variables. The statistical model may be used to determine the joint probability distribution over the variables or subsets thereof. For example, the statistical model may be used to determine the degree to which a first entity and/or event is relevant to a second entity and/or event.

In some embodiments, the statistical model is a graphical model (e.g., a probabilistic directed acyclical graphical model, such as a Bayesian network). The nodes of the graphical model may represent the variables of the statistical model (e.g., entities), and the edges of the graphical model may represent relevance relationships (e.g., direct relevance relationships) among the nodes. In some embodiments, the graphical model includes a directed edge from a node representing entity E1 to a node representing entity E2 if E1 is relevant (e.g., directly relevant) to E2. (It can be appreciated that a graphical model constructed in this manner may include cycles, because two nodes may influence each other. If desired, such cycles can be detected and broken using any suitable technique.)

In some embodiments, the graphical model can be used to identify entities associated with a security incident. Relevance values may be assigned to the graphical model's edges. The relevance value of an edge from node N1 (representing an entity E1) to a node N2 (representing an entity E2) can represent the degree to which entity E1 is relevant to (e.g., influences) entity E2. Such relevance values may be determined based on (1) attributes of the event represented by the edge, (2) attributes of the entities represented by the nodes, and/or (3) any other suitable information. In some embodiments, the relevance value of an edge includes a decay component, such that relevance values decay as the length of the path between two nodes increases. One or more nodes of interest (e.g., nodes corresponding to entities already associated with the security event) may then be selected, and interest values may be assigned to those nodes. The interest values may then be propagated through the network, and after the network quiesces, the guidance system 100 may identify additional nodes of interest based on their propagated interest values. For example, a specified number of nodes with the highest interest values may be identified as being nodes of interest, all the nodes having interest values higher than a specified threshold value may be identified as nodes of interest, etc. In this way, the relevance data may be used to associate entities with security incidents in scenarios in which conventional tools might not detect the association.

In some embodiments, the graphical model can be used to estimate the utility of investigating an entity by assigning known utility values to the graphical model's nodes (entities), assigning relevance values to the graphical model's edges (events), and propagating the utility values within the graphical model. The known utility values of one or more of the model's nodes may be determined using the utility estimation techniques described herein. The relevance value of an edge from a node N1 (representing an entity E1) to a node N2 (representing an entity E2) can represent the degree to which entity E1 is relevant to (e.g., influences) entity E2, or the degree to which the utility of investigating entity E2 is influenced (e.g., amplified or limited) by investigating entity E1. The utility values may then be propagated through the network, and after the network quiesces, the guidance system 100 may identify additional nodes of interest based on their propagated utility values.

In some embodiments, the objective utility estimation module 110 generates individual estimates of the objective utility of investigating an event based on different types of objective utility estimation data. For example, the objective utility estimation module 110 may generate an objective estimate of utility based on reputation data, an objective estimate of utility based on frequency data, and/or an objective estimate of utility based on adjacency data.

Any suitable technique for generating an individual estimate of objective utility based on objective utility estimation data may be used. In some embodiments, an individual objective estimate of the utility of investigating a security event based on reputation data is generally higher in cases where the reputation data indicate that at least one entity associated with the security event has a relatively bad reputation. In some embodiments, an individual objective estimate of the utility of investigating a security event based on frequency data is generally higher in cases where the frequency data indicate that a frequency of occurrence of the event is relatively low, that an investigation rate associated with the event is relatively high, and/or that a problem rate associated with the event is relatively high. In some embodiments, an individual objective estimate of the utility of investigating a security event based on adjacency data is generally higher in cases where the adjacency data indicate that the adjacency of the event to other security events is relatively low. In some embodiments, an individual objective estimate of the utility of investigating a security event based on adjacency data is generally higher in cases where the adjacency data indicate that the event has a relatively high adjacency to other security events that have a relatively high correlation with actual security problems (e.g., other security events with relatively high investigation rates and/or problem rates). The objective utility estimation module 110 may determine whether a value is "relatively low" or "relatively high" using any suitable technique, for example, by comparing the value to one or more threshold values, by using probability distributions to determine the likelihood of a value and comparing that likelihood to a threshold, etc.

In some embodiments, the objective utility estimation module 110 generates an aggregate estimate of the objective utility of investigating a security event based on two or more different types of objective utility estimation data. An aggregate estimate of objective utility may be generated by combining two or more individual estimates of objective utility (e.g., by calculating a weighted sum or weighted average of two or more individual estimates), and/or by any other suitable technique. In some embodiments, the objective utility estimation module 110 automatically adjusts the weightings of the individual estimates to refine the aggregate estimates. Such adjustments may, for example, be based on the accuracy or inaccuracy of utility estimates previously provided by the objective utility estimation module 110. In some embodiments, a user (e.g., forensic investigator) may manually assign or adjust the weightings of the individual estimates.

The utility estimation module 110 may indicate the estimated objective utility of investigating an event using a set of classifications (e.g., useful/not useful; high utility/moderate utility/low utility/no utility; etc.), a numerical rating (e.g., a numerical value between 1 and 10, where values toward one end of the range represent higher utility and values toward the other end of the range represent lower utility), etc.

The subjective utility estimation module 120 may estimate the subjective utility of investigating security events based on subjective utility estimation data 140. The subjective utility estimation data may include, without limitation, investigator interest data, and/or any other data suitable for estimating the subjective utility (e.g., to a forensic investigator) of investigating a security event in connection with a forensic investigation of a security incident.

Investigator interest data may include any data indicative of one or more forensic investigators' level of interest in performing investigations of particular events or types of events in connection with a forensic investigation of a security incident. Some examples of investigator interest data include data indicating which events an investigator has and/or has not investigated during the current incident response or during past incident responses (e.g., responses to security incidents similar to the security incident that is the subject of the current forensic investigation), data indicating how the investigator has responded to suggestions (e.g., suggestions made by the guidance system 100) to investigate particular events or types of events during the current incident response or during past incident responses, etc.

Some examples of investigator responses to such suggestions may include initiating an investigation of the security event or failing to do so (e.g., immediately, within a specified time period, prior to the completion of the forensic investigation, prior to initiating investigations of other security events, prior to completing previously initiated investigations of other security events, etc.), completing an investigation of the security event or failing to do so after the investigation is initiated, providing feedback indicative of the investigator's assessment of the utility of an investigation of the security incident (e.g., scoring or rating the utility of an uninitiated, initiated, or completed investigation of a security event, dismissing a prompt to investigate a security event without initiating the suggested investigation, etc.), etc.

In some embodiments, the subjective utility estimation data may be used to train a predictive model of the subjective utility of investigating security events, and the trained predictive model may be used (e.g., by the subjective utility estimation module 120) to estimate the subjective utility of investigating security events. Any suitable type of predictive model may be used, including, without limitation, a parametric model, a non-parametric model, a semi-parametric model, a classifier (e.g., a naïve Bayes classifier, a k-nearest neighbor classifier, a majority classifier, a support vector machine, a random forest, a boosted tree, a decision tree, a classification tree, a neural network, etc.), a least squares predictor, a regression model, a regression tree, etc. Other techniques for estimating the subjective utility of investigating a security event based on subjective utility estimation data may be used.

The nature of the data used to train the predictive model can have a significant impact on the extent to which the predictive model is generally applicable to different investigators and/or to investigations of different types of security incidents, or customized for particular investigators and/or investigations of particular types of security incidents. In some embodiments, the predictive model may be trained using subjective utility estimation data that indicate the subjective utility of event investigations to investigators in general, such that the resulting predictive model is generally applicable to forensic investigators in general. In some embodiments, the predictive model may be trained using subjective utility estimation data that indicate the subjective utility of event investigations to one or more particular investigators, such that the resulting predictive model is specifically adapted to the preferences of those investigators. In some embodiments, the predictive model may be trained using subjective utility estimation data that indicate the subjective utility of event investigations to forensic investigations in general, such that the resulting predictive model is generally applicable to forensic investigations in general. In some embodiments, the predictive model may be trained using subjective utility estimation data that indicate the subjective utility of event investigations to investigations of one or more particular types of security incidents, such that the resulting predictive model is specifically adapted for investigations of those types of security incidents.

The predictive model may indicate the subjective utility of investigating a security event by assigning a classification to the event investigation (e.g., high utility/moderate utility/low utility/no utility, etc.) by assigning a numerical rating to the event investigation (e.g., a numerical value between 1 and 10, where values toward one end of the range represent higher utility and values toward the other end of the range represent lower utility), etc. In some embodiments, a subjective estimate of the utility of investigating a security event is generally higher in cases where the subjective utility estimation data indicate that an investigator has investigated similar events and/or has acceded to suggestions to investigate similar events in the past.

The guidance system 100 may generate an estimate of the utility of an event investigation based, at least in part, on the estimate(s) of objective utility provided by the objective utility estimation module 110, the estimate(s) of subjective utility provided by the subjective utility estimation module 120, and/or a combination thereof. In some embodiments, the guidance system 100 uses the estimate(s) of objective utility to select a subset of security events (e.g., from a larger set of security events associated with a security incident) for which forensic investigations are estimated to have relatively high objective utilities, and uses the estimate(s) of subjective utility to rank the selected subset of events (e.g., according to the estimated subjective utility of investigating the events). In some embodiments, the guidance system 100 uses the estimates of subjective utility to select a subset of security events (e.g., from a larger set of security events associated with a security incident) for which forensic investigations are estimated to have relatively high subjective utilities, and uses the estimates of objective utility to rank the selected subset of events (e.g., according to the estimated objective utility of investigating the events).

In some embodiments, any suitable portion of the subjective utility estimates and/or the objective utility estimates may be used to select a subset of security events (e.g., from a larger set of security events associated with a security incident) for which forensic investigations are estimated to have relatively high utilities. In some embodiments, any suitable portion of the subjective utility estimates and/or the objective utility estimates may be used to rank the selected subset of events (e.g., according to the estimated utility of investigating the events). In cases where estimates of objective utility and estimates of subjective utility are used together to generate an aggregate utility value, the aggregate utility value may be generated by combining the constituent utility values (e.g., by calculating a weighted sum or weighted average of the constituent utility values), and/or by any other suitable technique.

During the selection phase, the guidance system 100 may use any suitable selection technique to select a subset of events based on the estimated utility of investigation. In some embodiments, the guidance system 100 selects all events for which the estimated utility of investigation is assigned a specified classification or exceeds a threshold utility value. In some embodiments, the guidance system 100 selects a specified number or fraction of events for which the estimated utility of investigation is highest.

In some embodiments, rather than selecting a subset of events and then ranking the selected events, the guidance system 100 may rank the events associated with a security incident according to the estimated utility of investigating those events, and then select a subset of the ranked events. The guidance system 100 may, for example, select all events for which the estimated utility of investigation exceeds a threshold utility value. In some embodiments, the guidance system 100 selects a specified number or fraction of events for which the estimated utility of investigation is highest.

In some embodiments, the guidance system 100 guides the investigator to prioritize investigations of events for which the utility of investigation is estimated to be high by implicitly or explicitly suggesting that the investigator perform such investigations prior to (or in lieu of) investigating other events. For example, the guidance system 100 may present (e.g., display) a list of security events ordered according to the corresponding rankings of the estimated utilities of investigating those events, and/or may prompt the investigator to perform event investigations with higher estimated utilities prior to (or in lieu of) prompting the investigator to investigate other events (e.g., by displaying data associated with events for which the estimated utility of investigation is high prior to, or in lieu of, displaying data associated with other events).

In some embodiments, the guidance system 100 selects a subset of events based on the utility of investigating those events, but does not rank the events. The guidance system 100 may guide the investigator to prioritize investigation of the selected events over investigation of other events. For example, the guidance system 100 may present (e.g., display) a list of security events that includes the selected security events and excludes the other security events associated with a security incident. As another example, the guidance system 100 may prompt the investigator to investigate the selected events, but not prompt the investigator to investigate the other events associated with a security incident.

Figure 2:
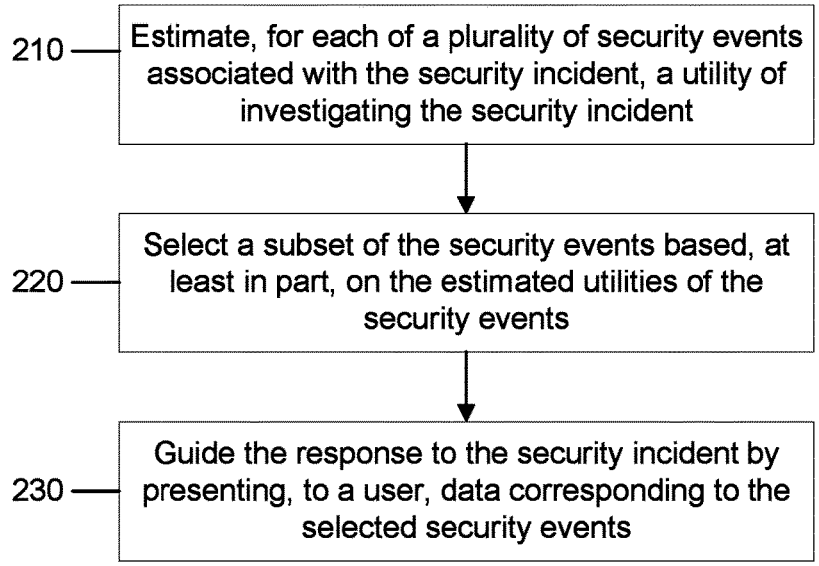
FIG. 2 is a flowchart of method for guiding a response to a security incident, in accordance with some embodiments.

FIG. 2 shows a method 200 for guiding a response to a security incident, in accordance with some embodiments. In some embodiments, the guidance method 200 is performed by the guidance system 100. In some embodiments, the guidance method 200 may guide an investigator to prioritize event investigations that are estimated to have greater utility to the response to the security incident, relative to investigations of other events (e.g., by implicitly or explicitly suggesting that the investigator perform such investigations prior to (or in lieu of) investigating other events).

In step 210 of the guidance method 200, the utility of investigating a security event is estimated for each of a plurality of security events associated with a security incident. In step 220, a subset of the security events is/are selected based, at least in part, on the estimated utilities of the security events. In step 230, the response to the security incident is guided by presenting, to a user, data corresponding to the selected security events. Some embodiments of the guidance method 200 are described in further detail below.

In step 210 of the guidance method 200, an estimate of the utility of investigating a security event is generated for each of a plurality of security events associated with a security incident. Some techniques for estimating the utility of investigating a security event are described above. In some embodiments, the utility of investigating a security event is estimated based on one or more objective indicators of utility, one or more subjective indicators of utility, or a combination thereof.

In step 220, a subset of the security events is/are selected based, at least in part, on the estimated utilities of the security events. Some techniques for selecting a subset of security events based on the estimated utilities of investigations of the security events are described above. In some embodiments, the security events corresponding to event investigations with the highest estimated utilities are selected.

In step 230, data corresponding to the selected security events are presented to a user (e.g., a forensic investigator). The data corresponding to the selected security events may be presented to the user prior to or in lieu of presenting data corresponding to the other security events. In this way, the guidance method 200 may guide the user to prioritize investigation of the selected events over investigation of other events. For example, a list of security events that includes the selected security events and excludes the other security events associated with a security incident may be presented. As another example, prompts to investigate the selected events may be presented, but prompts to investigate the other events associated with a security incident may not be presented.

The data corresponding to the selected security events may be presented by displaying the data, generating a document containing the data, transmitting a message containing the data, or using any other suitable technique. For example, data corresponding to one or more security events may displayed in a message box or a list box of a user interface, along with a prompt to investigate the security event(s).

In some embodiments, the guidance method 200 may include a ranking step. In the ranking step, the selected security events may be ranked. The rankings assigned to the selected security events may be based, at least in part, on objective and/or subjective indicators of the utilities of investigations of the security events. In some embodiments, the indicators of utility used to rank the selected security events may differ, at least in part, from the indicators of utility used to select the security events. For example, in some embodiments, the selection of security events may be based on estimated utility values derived from objective indicators of utility, and the ranking of the selected security events may be based on estimated utility values derived from subjective indicators of utility.

An example has been described in which security events corresponding to investigations with relatively high estimated utility are selected, and the user is prompted to investigate the selected security events. In some embodiments, security events corresponding to investigations with relatively low estimated utility are selected, and the user is prompted to eliminate the selected security events from consideration for further investigation.

The guidance method 200 illustrated in FIG. 2 and described above is just one example of a method for guiding an incident response based on estimates of the utility of investigating security events associated with a security incident. Utility estimates generated in accordance with the techniques described herein and their equivalents may be used in any suitable incident response methods and systems.

Further Description of Some Embodiments

Some embodiments of the systems, methods, and operations described in the present disclosure can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, e.g., one or more modules of computer program instructions, encoded on a computer storage medium for execution by, or to control the operation of, data processing apparatus.

Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of the foregoing. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

Some embodiments of the methods and operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, for example web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Some embodiments of the processes and logic flows described in this specification can be performed by one or more programmable processors executing one or more computer programs to perform actions by operating on input data and generating output. Some embodiments of the processes and logic flows described herein can be performed by, and some embodiments of the apparatus described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both.

Figure 3:
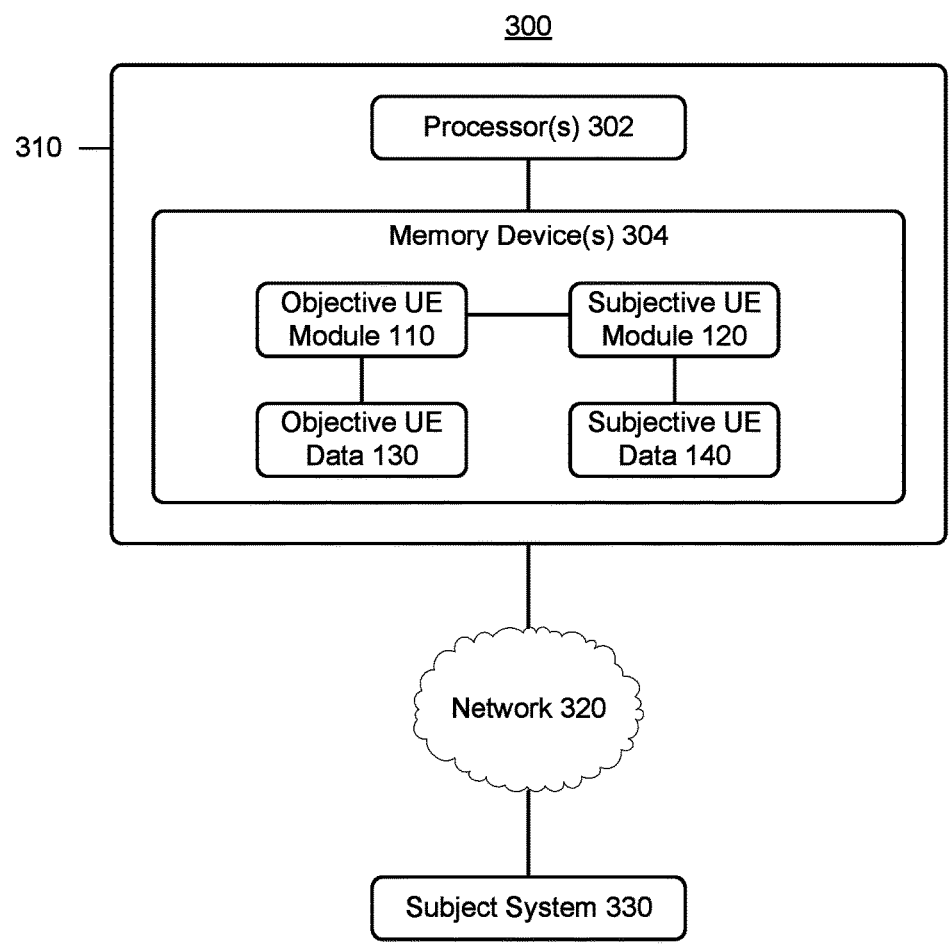
FIG. 3 is a block diagram of a computer system, in accordance with some embodiments.

FIG. 3 shows a block diagram of a computer system 300, in accordance with some embodiments. The computer system 300 includes a computer 310. The computer 310 includes one or more processors 302 for performing actions in accordance with instructions and one or more memory devices 304 for storing instructions and data.

In some embodiments, the computer 310 implements a guidance system 100 or a portion thereof. For example, the memory device(s) 304 may store instructions that, when executed, implement an objective utility estimation module 110 and/or an objective utility estimation module 120. In some embodiments, the memory device(s) 304 store objective utility estimation data 130 and/or subjective utility estimation data 140. Different versions of the utility estimation modules and data may be stored, distributed, or installed. In some embodiments, the computer 310 may perform the guidance method 200. In some embodiments, the computer 310 may implement only some embodiments of the methods described herein.

In some embodiments, a computer 310 that implements a guidance system 100 may be communicatively coupled to a subject computer system 330 via a communication network 320. Examples of communication networks 320 include a local area network ("LAN") and a wide area network ("WAN"), an inter-network (e.g., the Internet), and peer-to-peer networks (e.g., ad hoc peer-to-peer networks). In some embodiments, the subject computer system 330 comprises the computer system that is the subject of the forensic investigation (and/or incident response) that is guided by the guidance system. In the example of FIG. 3, the computer 310 that implements the guidance system 100 is shown as being distinct from the computer system that is the subject of the forensic investigation. However, in some embodiments, the computer 310 that implements the guidance system 100 may be a part of the computer system that is the subject of the forensic investigation.

Generally, a computer 310 will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD- ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Some embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination.

Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations may be described in this disclosure or depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.
Equivalents

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

We claim:

1. A method for guiding a response to a security incident, comprising:
    identifying a plurality of security events associated with the security incident, wherein the plurality of security events include a first group of security events and a second group of security events, and wherein identifying the plurality of security events includes:
        determining that the security events in the first group are associated with the security incident, and
        determining that each security event in the second group is relevant to a respective event in the first group, wherein relevance of a first security event to a second security event is determined based on an extent to which activities or attributes of a first entity associated with the first security event influence activities or attributes of a second entity associated with the second security event;
    for two or more individual security events in the plurality of security events associated with the security incident, estimating a respective utility of investigating each individual security event;
    pruning a first, non-empty subset of the individual security events associated with the security incident based, at least in part, on the estimated utilities of investigating the pruned security events, wherein a second non-empty subset of the individual security events associated with the security incident remain after the pruning; and
    guiding the response to the security incident by presenting, to a user, data corresponding to the remaining subset of individual security events associated with the security incident.

2. The method of claim 1, wherein the two or more individual security events include the first security event, and wherein the utility of investigating the first security event is estimated based, at least in part, on one or more objective and/or subjective indicators thereof.

3. The method of claim 2, wherein the one or more objective indicators of the utility of investigating the first security event include reputational data indicating a reputation of an entity associated with the first security event, frequency data indicating a frequency of the first security event, and/or adjacency data indicating an adjacency of the first security event to one or more other security events.

4. The method of claim 3, wherein the reputational data indicate a reputation of a file associated with the first security event, a reputation of a software provider that provided or certified the file, a reputation of a process associated with the first security event, and/or a reputation of an entity corresponding to communications associated with the first security event.

5. The method of claim 3, further comprising selecting the one or more other security events from a set of security events previously investigated in connection with the response to the security incident, from a set of security events previously presented in connection with the response to the security incident, and/or from a set of security events previously presented in connection with a response to another security incident.

6. The method of claim 3, further comprising determining the adjacency of the first security event to the one or more other security events based, at least in part, on one or more relevance values indicating extents of relevance of the first security event to the one or more other security events, respectively.

7. The method of claim 2, wherein the one or more subjective indicators of the utility of investigating the first security event include interest data indicating an investigator's level of interest in investigating security events.

8. The method of claim 7, wherein the interest data are obtained based, at least in part, on a machine-executable predictive model of one or more forensic investigators' level of interest in performing investigations of security events.

9. The method of claim 8, wherein the predictive model includes a classifier trained to classify security events based on types and/or attributes of the security events.

10. The method of claim 1, further comprising assigning respective rankings to the individual security events in the remaining subset, wherein the data corresponding to the individual security events in the remaining subset are presented in accordance with the assigned rankings.

11. The method of claim 10, wherein the rankings are assigned to the individual security events in the remaining subset based, at least in part, on one or more objective and/or subjective indicators of respective utilities of investigating the individual security events in the remaining subset.

12. The method of claim 11, wherein the one or more subjective indicators of the utilities of investigating the individual security events in the remaining subset include interest data indicating an investigator's level of interest in investigating security events, and wherein the interest data are obtained based, at least in part, on a machine-executable predictive model of one or more forensic investigators' level of interest in performing investigations of security events.

13. The method of claim 12, wherein the predictive model includes a classifier trained to classify security events based on types and/or attributes of the security events.

14. The method of claim 1, further comprising prompting the user to investigate one or more of the individual security events in the remaining subset and/or to eliminate one or more of the individual security events in the remaining subset from consideration for investigation.

15. A system comprising:
data processing apparatus programmed to perform operations comprising:
identifying a plurality of security events associated with the security incident, wherein the plurality of security events include a first group of security events and a second group of security events, and wherein identifying the plurality of security events includes:
determining that the security events in the first group are associated with the security incident, and
determining that each security event in the second group is relevant to a respective event in the first group, wherein relevance of a first security event to a second security event is determined based on an extent to which activities or attributes of a first entity associated with the first security event influence activities or attributes of a second entity associated with the second security event;
for two or more individual security events in the plurality of security events associated with the security incident, estimating a respective utility of investigating each individual security event;
pruning a first, non-empty subset of the individual security events associated with the security incident based, at least in part, on the estimated utilities of investigating the pruned security events, wherein a second non-empty subset of the individual security events associated with the security incident remain after the pruning; and
guiding a response to the security incident by presenting, to a user, data corresponding to the remaining subset of individual security events associated with the security incident.

16. The system of claim 15, wherein the two or more individual security events include the first security event, and wherein the utility of investigating the first security event is estimated based, at least in part, on one or more objective and/or subjective indicators thereof.

17. The system of claim 16, wherein the one or more objective indicators of the utility of investigating the first security event include reputational data indicating a reputation of an entity associated with the first security event, frequency data indicating a frequency of the first security event, and/or adjacency data indicating an adjacency of the first security event to one or more other security events.

18. The system of claim 17, wherein the reputational data indicate a reputation of a file associated with the first security event, a reputation of a software provider that provided or certified the file, a reputation of a process associated with the first security event, and/or a reputation of an entity corresponding to communications associated with the first security event.

19. The system of claim 17, wherein the operations further comprise selecting the one or more other security events from a set of security events previously investigated in connection with the response to the security incident, from a set of security events previously presented in connection with the response to the security incident, and/or from a set of security events previously presented in connection with a response to another security incident.

20. The system of claim 17, wherein the operations further comprise determining the adjacency of the first security event to the one or more other security events based, at least in part, on one or more relevance values indicating extents of relevance of the first security event to the one or more other security events, respectively.

21. The system of claim 16, wherein the one or more subjective indicators of the utility of investigating the first security event include interest data indicating an investigator's level of interest in investigating security events.

22. The system of claim 21, wherein the interest data are obtained based, at least in part, on a machine-executable predictive model of one or more forensic investigators' level of interest in performing investigations of security events.

23. The system of claim 22, wherein the predictive model includes a classifier trained to classify security events based on types and/or attributes of the security events.

24. The system of claim 15, wherein the operations further comprise assigning respective rankings to the individual security events in the remaining subset, and wherein the data corresponding to the individual security events in the remaining subset are presented in accordance with the assigned rankings.

25. The system of claim 23, wherein the rankings are assigned to the individual security events in the remaining subset based, at least in part, on one or more objective and/or subjective indicators of respective utilities of investigating the individual security events in the remaining subset.

26. The system of claim 25, wherein the one or more subjective indicators of the utilities of investigating the individual security events in the remaining subset include interest data indicating an investigator's level of interest in investigating security events, and wherein the interest data are obtained based, at least in part, on a machine-executable predictive model of one or more forensic investigators' level of interest in performing investigations of security events.

27. The system of claim 26, wherein the predictive model includes a classifier trained to classify security events based on types and/or attributes of the security events.

28. The method of claim 1, wherein the activities or attributes of the first entity associated with the first security event directly influence the activities or attributes of the second entity associated with the second security event as a result of the first entity performing an operation on the second entity, communicating with the second entity, accessing resources of the second entity, and/or being derived from the second entity.

29. The method of claim 28, wherein the activities or attributes of the first entity associated with the first security event indirectly influence the activities or attributes of the second entity associated with the second security event as a result of the first entity directly influencing a third entity and the third entity directly and/or indirectly influencing the second entity.

30. The method of claim 1, wherein estimating the respective utility of investigating each individual security event comprises:
   assigning a respective value to each security event in the first group of security events, the assigned value representing the utility of investigating the respective security event; and
   propagating the assigned values from the security events in the first group to the security events in the second group.

31. The method of claim 30, wherein the values are propagated based on the relevance of the security events in the plurality of security events to each other.

32. The method of claim 1, wherein:
   the first group of security events includes one or more first events associated with a first file instantiating a first process, the first process creating a second file, and the first process registering the second file to run as a service;
   the second group of security events includes one or more second events associated with an operating system initiating the service; and
   the second events are determined to be relevant to the first events.

* * * * *